(12) United States Patent
Robert et al.

(10) Patent No.: US 7,649,042 B2
(45) Date of Patent: Jan. 19, 2010

(54) RUBBER COMPOSITION FOR RUNNING TREAD AND METHOD FOR OBTAINING SAME

(75) Inventors: Pierre Robert, Perignat-les-Sarlieve (FR); Samuel Mathieu, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 372 days.

(21) Appl. No.: 10/852,245

(22) Filed: May 25, 2004

(65) Prior Publication Data

US 2005/0004267 A1 Jan. 6, 2005

Related U.S. Application Data

(63) Continuation of application No. PCT/EP02/13230, filed on Nov. 25, 2002.

(30) Foreign Application Priority Data

Nov. 26, 2001 (FR) .................................. 01 15561

(51) Int. Cl.
*C08K 3/18* (2006.01)
(52) U.S. Cl. ..................... 524/430; 524/437; 524/492
(58) Field of Classification Search ................ 524/492, 524/430, 437
See application file for complete search history.

(56) References Cited

U.S. PATENT DOCUMENTS

| 2,710,292 A | 6/1955 | Brown |
| 3,346,631 A | 10/1967 | Boyer et al. |
| 6,028,137 A | 2/2000 | Mahmud et al. ............ 524/496 |
| 6,667,353 B2 | 12/2003 | Agostini et al. ............. 523/212 |

FOREIGN PATENT DOCUMENTS

| EP | 0 704 481 | 4/1996 |
| WO | WO 01/14470 | 3/2001 |
| WO | WO01/14470 | 3/2001 |

*Primary Examiner*—Edward J Cain
(74) *Attorney, Agent, or Firm*—Buchanan Ingersoll & Rooney PC

(57) ABSTRACT

The present invention relates to a rubber composition usable for constituting a tire tread, said composition being based on at least (i) a reinforcing inorganic filler, (ii) a diene elastomer having a molar ratio of units originating from conjugated dienes which is greater than 30% which is prepared in emulsion and comprises carboxylic acid functions along its chain, and (iii) a bonding agent between said reinforcing inorganic filler and said elastomer which consists of a polysulphurised alkoxysilane. This composition is such that said elastomer is capable of being obtained by effecting: in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain.

31 Claims, No Drawings

RUBBER COMPOSITION FOR RUNNING TREAD AND METHOD FOR OBTAINING SAME

This application is a continuation of International PCT/EP02/13230 filed on Nov. 25, 2002, and which claims priority under 35 U.S.C. § 119 to patent application Serial No. 01/15561 filed in France on Nov. 26, 2001.

BACKGROUND OF THE INVENTION

The present invention relates to a cross-linkable or cross-linked rubber composition which is usable to constitute a tire tread and which has, in the non-cross-linked state, an improved reinforcement properties, and also to a process for the preparation of this improved processing ability and, in the cross-linked state, minimized hysteresis losses and composition. The invention also relates to a tire tread and a tire incorporating it.

Since fuel economies and the need to preserve the environment have become priorities, it has become desirable to produce mixes having good mechanical properties and as low a hysteresis as possible so that they can be processed in the form of rubber compositions usable for the manufacture of various semi-finished products involved in the constitution of tires, such as, for example, underlayers, sidewalls or treads, and in order to obtain tires having reduced rolling resistance.

To achieve such an objective, numerous solutions have been proposed, consisting in particular of modifying the structure of the diene polymers and copolymers at the end of polymerisation by means of functionalizing, coupling or starring agents. The very great majority of these solutions have concentrated on the use of functionalized polymers which are active with respect to carbon black, with the aim of obtaining a good interaction between the polymer thus modified and the carbon black.

By way of illustration of this prior art relating to reinforcing fillers formed of carbon black, mention may for example be made of US Patent Specification U.S. Pat. No. 3,135,716, which describes the reaction of living diene polymers at the chain end with a polyfunctional organic coupling agent in order to obtain polymers having improved properties. Mention may also be made of US Patent Specification U.S. Pat. No. 3,244,664, which discloses the use of tetra-alkoxysilanes as coupling agents or starring agents for diene polymers.

Silica has been used as reinforcing filler in cross-linkable rubber compositions, in particular those intended to constitute tire treads, for a long time. However, this use has remained very limited, owing to the unsatisfactory level of certain physical properties of such compositions, in particular abrasion resistance.

This is why it has been proposed, in order to overcome these drawbacks, to use functionalized diene polymers instead of the non-functionalized polymers which were used before, and in particular polymers functionalized by alkoxysilane derivatives, such as tetraethoxysilanes. For example, mention may be made of US Patent Specification U.S. Pat. No. 5,066,721, which describes a rubber composition comprising a diene polymer functionalized by an alkoxysilane having at least one non-hydrolysable alkoxyl radical, which makes it possible to eliminate the polymerisation solvent by steam stripping.

One disadvantage of these functionalization reactions lies in the coupling reactions which accompany them, which generally makes it necessary to use an excess of alkoxysilane and/or intensive mixing in order to minimize these coupling reactions.

Another drawback of these reactions lies in the later carrying out of the steam stripping operation, which is necessary to eliminate the polymerisation solvent.

In fact, generally, experience shows that the functionalized polymers obtained undergo changes in macrostructure during this stripping operation, which results in serious degradation of their properties, unless one is limited to using as functionalizing agent an alkoxysilane belonging to a restricted family, such as that described in the aforementioned document U.S. Pat. No. 5,066,721.

Consequently, it emerges from the above that the use of diene polymers comprising an alkoxysilane function to obtain rubber compositions comprising silica as reinforcing filler is not satisfactory, despite the improved physical properties of these compositions.

This is why research has been carried out on other functionalization reactions, always with a view to obtaining such rubber compositions. By way of example, mention may be made of French Patent Specification FR-A-2 740 778 in the name of the Applicant, which discloses the incorporation, in rubber compositions comprising as reinforcing filler silica in a majority proportion (for example comprising a blend of silica and carbon black), of diene polymers bearing at the chain end a silanol function or a polysiloxane block having a silanol end. For example, a functionalizing agent consisting of a cyclic polysiloxane is used, such as hexamethylcyclotrisiloxane. The functionalized polymers which are obtained can be separated from the reaction medium resulting in their formation by steam extraction of the solvent, without their macrostructure and, consequently, their physical properties, changing.

Mention may also be made of European Patent Specification EP-A-877 047, which discloses the incorporation of such polymers having a silanol function in rubber compositions comprising as reinforcing filler carbon black having silica fixed to its surface.

It has been established that these polymers impart rubber properties, in particular hysteresis and reinforcement properties in the cross-linked state, which are improved compared with those of "control" compositions based on non-functional diene polymers, and which are at least analogous to those of compositions based on diene polymers having an alkoxysilane function.

Mention may also be made of European Patent Specification EP-A-692 493, which establishes that diene polymers bearing at the chain end alkoxysilane groups and an epoxy group result in improved reinforcement properties and in reduced hysteresis losses at low and high deformations.

One disadvantage of these polymers, which comprise a functional group which is active for coupling to silica or to carbon black surface-modified by silica, is that the improvement in the hysteresis and reinforcement properties which they impart to the rubber compositions incorporating them is generally accompanied by a processing ability of the non-cross-linked mixes which is compromised compared with that of non-functional "control" polymers.

Among the other functionalization reactions studied, mention may be made of the functionalization of diene polymers prepared in solution along the chain by COOH functions.

This COOH functionalization along the chain can be effected by direct metallation, in the presence of N,N,N',N'-tetramethylethylenediamine (TMED), by means of butyllithium or metallic sodium (as described in patent specifications U.S. Pat. No. 3,978,161 and U.S. Pat. No. 3,976,628, respectively), followed by a carbonation reaction by means of carbon dioxide.

Such a process has the disadvantage of generally resulting in breaks in the chain of the modified polymer.

For grafting COOH functions along the chain of a diene polymer by a post-polymerisation grafting reaction, there have also been used mercaptans comprising a carbonyl group, such as a carboxylic acid group (for example 3-mercaptopropionic acid), an aldehyde group or a primary alcohol group, and amine compounds comprising such a carbonyl group.

By way of examples of these mercaptans or amine compounds comprising a carbonyl group, mention may be made respectively of two reagents of respective formulae $HSCH_2CO_2CH_3$ and $N_2CHCO_2CH_2CH_3$. For the description of the reaction mechanisms relating to the use of these two reagents, reference may be made to the articles "K. Sanui, R. W. Lenz, W. J. MacKnight, J. Poly. Sci., Polym. Chem. Ed. 12, 1965 (1974)" and "H. Tanaka, W. J. MacKnight, J. Poly. Sci., Polym. Chem. Ed. 17, 2975 (1979)".

One major disadvantage of using these carbonylated mercaptans or amino-esters is that it always results in significant changes in macrostructure characterized by great degradation of the distribution of the molecular weights for the modified polymer, which makes these reagents undesirable within the context of the present invention.

The functionalization by COOH functions along the chain may also be effected by means of carbon monoxide, either by hydroformylation followed by oxidation of the aldehyde formed (as described in US Patent Specification U.S. Pat. No. 4,912,145), or by direct hydrocarboxylation of the polymer (as described in the article "A. Nait Ajjou, H. Alper, Macromolecules 29, 1784 (1996)"). The catalysts used for these reactions are based on rhodium or palladium.

One disadvantage of this functionalization by carbon monoxide lies, on one hand, in the drastic nature of the operating conditions and, on the other hand, in the frequent formation of a gel in the reaction medium.

Functionalization by means of maleic anhydride is more widespread. It makes it possible to obtain succinic anhydride units, which are precursors of the COOH functions, along the chain by post-polymerisation grafting. Reference may be made to US Patent Specification U.S. Pat. No. 4,082,817 for an example of implementation of such functionalization. However, this type of functionalization may also result in the formation of a gel.

Radical polymerisation in emulsion is also known to yield polymers having COOH functions along the chain. For a general description of this type of polymerisation, reference may be made to the work "Emulsion Polymerization and Emulsion Polymers", P. A. LOVELL and M. S. EL-AASSER, John Wiley and Sons (1997), pp. 558-561 (see also the references cited therein).

In the past, attempts have been made to use diene elastomers having COOH functions along the chain to prepare rubber compositions usable in tires, as is illustrated by the documents commented on hereafter.

US Patent Specification U.S. Pat. No. 5,494,091 in fact discloses a rubber composition filled with carbon black comprising from 25 to 55 phr of polyisoprene and from 45 to 75 phr (phr: parts by weight per hundred parts of elastomeric matrix) of a diene polymer belonging to the group consisting of homopolymers of conjugated dienes and copolymers of conjugated dienes with mono-olefins, such as EPDM terpolymers (ethylene, propylene and a diene), part of this polymer comprising COOH functions grafted along the chain by reaction with an unsaturated metal carboxylic acid salt, for example zinc dimethacrylate. The composition obtained is supposed to have a sufficiently high rigidity to be used in an internal reinforcement rubber for tire sidewalls, so as to permit travel with a flat tire under satisfactory conditions.

Patent specification WO-A-01/14470 discloses a process for manufacturing a tire, consisting of cross-linking, during the curing of the tire, a cross-linkable rubber composition included in this tire based on a diene elastomer prepared in solution or in emulsion and comprising COOH functions along the chain, without using the slightest cross-linking system. This cross-linkable rubber composition comprises an epoxidised organic liquid which is intended to allow the cross-linking thereof upon curing.

These compositions may equally well comprise carbon black, silica or any other reinforcing filler known in the tire industry and, with reference to the examples of embodiment of this document, only elastomers having a molar ratio of units resulting from dienes which is less than 15% are used as diene elastomers comprising COOH functions, such as nitrile rubbers (copolymers of butadiene and acrylonitrile). The teaching of this document does not relate specifically to rubber compositions usable to form tire treads.

SUMMARY OF THE INVENTION

The object of the present invention is to propose a rubber composition which has, in the non-cross-linked state, improved processing ability and, in the cross-linked state, minimized hysteresis losses and improved reinforcement properties, and which is usable to constitute on its own a tread of a tire.

This object is achieved in that the applicants have surprisingly discovered that a rubber composition based on at least one specifically inorganic reinforcing filler, a diene elastomer prepared in emulsion having a molar ratio of units originating from conjugated dienes which is greater than 30% and comprising carboxylic acid functions along its chain, and a reinforcing inorganic filler/diene elastomer bonding agent comprising a polysulphurised alkoxysilane, this diene elastomer being obtained by effecting:

in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain, has improved reinforcement properties and minimized hysteresis losses at low and high deformations, compared with those of known compositions comprising a reinforcing inorganic filler as reinforcing filler and being based on a non-functional elastomer or alternatively an elastomer comprising along the chain ester functions originating from said precursor comonomer, while having processing properties in the non-cross-linked state which are comparable to those of these known compositions.

It will be noted that the present invention lies in particular in the particularly advantageous interaction between, on one hand, an "essentially unsaturated" diene elastomer (i.e. comprising a molar ratio of units originating from conjugated dienes greater than 30%) having been prepared in emulsion and comprising COOH functions along the chain which have been introduced using a specific copolymerisation process, and, on the other hand, a reinforcing inorganic filler, for obtaining a cross-linkable or cross-linked rubber composition, for example by means of a sulphur vulcanisation system.

In fact, contrary to the traditional processes for grafting COOH functions along the chain by a post-polymerisation reaction which impart to the elastomers obtained in emulsion a very branched structure and, consequently, a high viscosity, which adversely affects the rubber properties of the compositions incorporating them, the process according to the invention imparts to the elastomer obtained in emulsion a more linear structure having a consequently reduced viscosity.

These advantageous characteriztics of the elastomer having COOH functions which is prepared in accordance with the process of the invention contribute to making the composition obtained usable for constituting a tire tread having in particular reduced rolling resistance.

"Diene" elastomer is understood to mean, in known manner, an elastomer (homopolymer or copolymer) resulting at least in part from diene monomers (monomers bearing two double carbon-carbon bonds, whether conjugated or not).

It will be noted that certain diene elastomers, such as butyl rubbers, nitrile rubbers or copolymers of dienes and alpha-olefins of the EPDM type, for example, cannot be used in the compositions according to the invention, owing to their reduced molar content of units originating from dienes (less than 15%) which makes the corresponding compositions unsuitable for constituting tire treads.

Even more preferably, said diene elastomer of the composition according to the invention is a "highly unsaturated" diene elastomer, that is to say, a diene elastomer having a molar content of units originating from conjugated dienes which is greater than 50%.

The following may be used as diene elastomer capable of being used in the compositions according to the invention:
  a homopolymer obtained by polymerisation of a conjugated diene monomer having 4 to 12 carbon atoms, or
  a copolymer obtained by copolymerisation of one or more dienes conjugated together or with one or more vinyl-aromatic compounds having 8 to 20 carbon atoms.

Suitable conjugated dienes are, in particular, 1,3-butadiene, 2-methyl-1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta- and para-methylstirene, the commercial mixture "vinyltoluene", para-tert. butylstirene, methoxystirenes, chlorostirenes, vinylmesitylene, divinylbenzene and vinylnaphthalene.

The copolymers may contain between 99% and 20% by weight of diene units and between 1% and 80% by weight of vinyl-aromatic units.

Particularly preferably, the diene elastomer of the composition according to the invention is selected from the group of highly unsaturated diene elastomers which consists of polybutadienes (BR), synthetic polyisoprenes (IR), butadiene-stirene copolymers (SBR), butadiene-isoprene copolymers (BIR), isoprene-stirene copolymers (SIR), butadiene-stirene-isoprene copolymers (SBIR), or a mixture of two or more of these compounds. Even more preferably, the diene elastomer belongs to the family consisting of polybutadienes, butadiene-stirene copolymers and butadiene-stirene-isoprene copolymers.

Preferably, the diene elastomer comprising COOH functions along the chain which is obtained by the process of the invention has a molecular weight greater than 100,000 g/mol.

According to one advantageous example of embodiment of the invention, the diene elastomer used is a butadiene-stirene copolymer prepared in emulsion, and it preferably has a total quantity of emulsifier which is less than 3.5 phr (phr: parts by weight per hundred parts of elastomer). Reference will be made to International Patent Specification WO-A-01/56812, the content of which is entirely incorporated in the present description by reference, for a detailed description of a rubber composition incorporating such a butadiene/stirene copolymer having a reduced content of emulsifying agent according to the present invention, the preparation process therefor and the tire tread comprising this composition.

There is used as precursor comonomer usable to obtain the intermediate diene elastomer comprising functions derived from carboxylic acid along the chain, advantageously, according to a first embodiment of the invention, an unsaturated carboxylic acid derivative which is hydrolysable to form said acid.

According to one example of embodiment of this first embodiment according to the invention, this hydrolysable carboxylic acid derivative is an unsaturated ester of the formula $R_1$—C(O)O—$R_2$, where $R_1$ is an aliphatic or alicyclic hydrocarbon group which comprises at least one double bond or alternatively an aromatic hydrocarbon group to which is linked a substituent comprising at least one double bond, and where $R_2$ is an alkyl group.

Preferably, this unsaturated ester belongs to the group constituted by alkyl acrylates, alkyl methacrylates and alkyl trans-3-phenyl propenoates.

Even more preferably, this unsaturated ester is a tert. butyl acrylate or methacrylate.

According to another example of embodiment of this first embodiment according to the invention, this hydrolysable carboxylic acid derivative is an unsaturated amide of the formula $R_3$—C(O)N—$R_4R_5$, where $R_3$ is an aliphatic or alicyclic hydrocarbon group which comprises at least one double bond or alternatively an aromatic hydrocarbon group to which is linked a substituent comprising at least one double bond, and where $R_4$ and $R_5$ are alkyl groups which are each linked to the nitrogen atom.

Preferably, this unsaturated amide belongs to the group consisting of acrylamide, methacrylamide, N,N-dimethylacrylamide, N,N-dimethylmethacrylamide, N-methylcinnamide, N-tert. butylcinnamide and N,N-dimethylcinnamide.

For an example of embodiment of the copolymerisation in emulsion of a conjugated diene monomer with an unsaturated amide, reference may be made to Chinese patent specifications CN-A-1,208,736 or CN-A-1,128,765, which disclose in particular the copolymerisation of butadiene and stirene with acrylamide.

According to another example of embodiment of this first embodiment according to the invention, this hydrolysable carboxylic acid derivative is an unsaturated nitrile of the formula $R_6$—CN, where $R_6$ is an aliphatic or alicyclic hydrocarbon group which comprises at least one double bond, or alternatively an aromatic hydrocarbon group to which is linked a substituent comprising at least one double bond.

Preferably, this unsaturated nitrile belongs to the group consisting of acrylonitrile, methacrylonitrile, vinylacetonitrile and 3-phenyl propenitrile.

For an example of embodiment of the copolymerisation in emulsion of a conjugated diene monomer with an unsaturated nitrile, reference may again be made to Chinese patent specification CN-A-1,128,765, which discloses in particular the copolymerisation of butadiene and stirene with acrylonitrile.

According to another example of embodiment of this first mode according to the invention, this hydrolysable carboxylic acid derivative is an unsaturated dicarboxylic acid anhydride which comprises at least one double bond.

Preferably, this unsaturated anhydride belongs to the group consisting of maleic anhydride and citraconic anhydride.

The carboxylic acid precursor functions which are obtained in the intermediate elastomer by copolymerisation with the precursor comonomer according to this first embodiment according to the invention are then hydrolysed in known manner to obtain COOH functions, for example by a saponification reaction in the case of a precursor comonomer consisting of an unsaturated ester.

As precursor monomer, it is also possible to use, according to a second embodiment of the invention, a compound oxidisable to carboxylic acid which belongs to the group consisting of:

- unsaturated alcohols of the formula $R_7$—OH, where $R_7$ is an aliphatic or alicyclic hydrocarbon group which comprises at least one double bond, or alternatively an aromatic hydrocarbon group to which is linked a substituent comprising at least one double bond, and
- unsaturated aldehydes of the formula $R_8$—CHO, where $R_8$ is an aliphatic or alicyclic hydrocarbon group which comprises at least one double bond, or alternatively an aromatic hydrocarbon group to which is linked a substituent comprising at least one double bond.

According to one example of embodiment of this second embodiment according to the invention, the precursor comonomer is an unsaturated alcohol belonging to the group consisting of allyl alcohol, crotyl alcohol, methallyl alcohol and cinnamyl alcohol.

According to another example of embodiment of this second embodiment according to the invention, the precursor comonomer is an unsaturated aldehyde belonging to the group consisting of crotonaldehyde and cinnamaldehyde.

The carboxylic acid precursor functions which are obtained in the intermediate elastomer by copolymerisation with the precursor comonomer according to this second embodiment according to the invention are then oxidised in known manner to obtain COOH functions.

Reference may be made to European patent specification EP-A-1 141 085 or the article "Catalytic oxidation of polyols by molecular oxygen in alkaline media, Kinet. Catal. (Transl. Of Kinet. Katal.), 1996, 37(3), pp. 368-376", for an example of implementation of the oxidation of alcohol functions to acid functions in a polymer.

DESCRIPTION OF PREFERRED EMBODIMENTS OF THE INVENTION

A rubber composition according to the invention such as defined previously is obtained by a process comprising the following steps:

(i) at least one diene elastomer comprising carboxylic acid functions along the chain and having a molar ratio of units originating from conjugated dienes which is greater than 30% is prepared in emulsion, using:

in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain; and (ii) there is then effected:

at a maximum temperature of between 130 and 200° C., a first phase of thermomechanical working or kneading (sometimes referred to as "non-productive" phase) of the constituents of said composition comprising the elastomer obtained in step (i), a reinforcing inorganic filler and a reinforcing inorganic filler/diene elastomer bonding agent comprising a polysulphurised alkoxysilane, with the exception of the cross-linking system, then a second phase of mechanical working or kneading (sometimes referred to as "productive" phase) at a temperature less than 120° C. (for example of between 60 and 100° C.), during which the cross-linking system is incorporated.

With regard to the first phase of thermomechanical working which is included in step (ii) of this preparation process according to the invention, this first phase comprises in known manner:

a first step in which said constituents used in said first phase, with the exception of the antioxidant, are mixed together, and a second step in which the antioxidant is incorporated and mixed with the constituents of said first step.

Furthermore, zinc monoxide is conventionally added during this first phase of thermomechanical working to activate the later cross-linking.

The Applicant unexpectedly discovered that incorporating all the zinc monoxide during the first step of thermomechanical working, contrary to the convention in which it is incorporated during the second step of thermomechanical working, makes it possible to minimize further the hysteresis losses at low deformations of the composition according to the invention in the cross-linked state, while imparting to this composition processing properties in the non-cross-linked state which are still improved compared with those of compositions based on known functional elastomers and which are comparable to those of the compositions according to the invention obtained by incorporation of the zinc monoxide during the second step of thermomechanical working.

The Applicant furthermore unexpectedly discovered that the incorporation of magnesium monoxide in the first step of thermomechanical working makes it possible to minimize further the hysteresis losses at low and high deformations of the composition according to the invention in the cross-linked state, while imparting to this composition processing properties in the non-cross-linked state which are similar to those of compositions based on non-functional elastomers.

Of course, the compositions of the invention may contain a single diene elastomer having COOH functions such as the aforementioned one or a mixture of several of these elastomers.

The diene elastomer(s) according to the invention having COOH functions along the chain may be used on their own in the composition according to the invention, or be used in a blend with any other elastomer conventionally used in tires, such as natural rubber or a blend based on natural rubber and a synthetic elastomer, or alternatively another diene elastomer which may possibly be coupled and/or starred or alternatively partially or entirely functionalized other than with COOH functions along the chain.

It will be noted that the improvement in the properties of the rubber composition according to the invention will be all the greater, the lower the proportion of said conventional elastomer(s) in the composition according to the invention. Advantageously, this or these conventional elastomer(s) may if applicable be present in the composition according to the invention in a quantity of from 0 to 70 parts by weight per 100 parts by weight of diene elastomer(s) according to the invention having COOH functions along the chain.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words being capable of replacing a conventional tire-grade carbon black filler in its reinforcement function.

Preferably, the reinforcing inorganic filler is present in the composition of the invention in a quantity equal to or greater than 40 phr (phr: parts by weight per hundred parts of diene elastomer(s)).

Also preferably, this reinforcing inorganic filler is present in a majority proportion in the reinforcing filler of the composition of the invention, such that its mass fraction in said reinforcing filler is greater than 50%.

Advantageously, the entirety or at the very least a majority proportion of said reinforcing inorganic filler is silica ($SiO_2$). The silica used may be any reinforcing silica known to the person skilled in the art, in particular any precipitated or fumed silica having a BET surface area and a specific CTAB surface area both of which are less than 450 $m^2/g$, even if the highly dispersible precipitated silicas are preferred.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR—NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8755 from Huber, and treated precipitated silicas such as, for example, the aluminium-"doped" silicas described in the aforementioned application EP-A-0735088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

It will be noted that the reinforcing filler of a rubber composition according to the invention may contain in a blend (mixture), in addition to the aforementioned reinforcing inorganic filler or fillers, carbon black in a minority proportion (that is to say, in a mass fraction of less than 50%). Suitable carbon blacks are any carbon blacks, in particular the blacks of type HAF, ISAF and SAF, which are conventionally used in tires, and particularly in tire treads. As non-limitative examples of such blacks, mention may be made of the blacks N115, N134, N234, N339, N347 and N375.

For example, black/silica blends or blacks partially or entirely covered with silica are suitable to form the reinforcing filler. Also suitable are reinforcing inorganic fillers comprising carbon blacks modified by silica such as, and this is non-limitative, the fillers sold by CABOT under the name "CRX 2000", which are described in International Patent Specification WO-A-96/37547.

As reinforcing inorganic filler, there may also be used, in non-limitative manner,
aluminas (of formula $Al_2O_3$), such as the aluminas of high dispersibility which are described in European Patent Specification EP-A-810 258, or alternatively
aluminium hydroxides, such as those described in International Patent Specification WO-A-99/28376.

In the event that the reinforcing filler contains only a reinforcing inorganic filler and carbon black, the mass fraction of this carbon black in said reinforcing filler is preferably selected to be less than or equal to 30%.

However, experience shows that the aforementioned properties of the composition according to the invention are improved all the more, the higher the mass fraction of reinforcing inorganic filler contained in the reinforcing filler which the composition comprises, and that said properties are optimum when said composition contains solely a reinforcing inorganic filler, for example silica, as reinforcing filler. This latter case therefore constitutes a preferred example of a rubber composition according to the invention.

The rubber composition according to the invention furthermore comprises, in conventional manner, a reinforcing inorganic filler/elastomeric matrix bonding agent (also referred to as coupling agent), the function of which is to ensure sufficient chemical and/or physical bonding (or coupling) between said inorganic filler and the matrix, while facilitating the dispersion of this inorganic filler within said matrix.

"Coupling agent" is more precisely understood to mean an agent capable of establishing a sufficient chemical and/or physical connection between the filler in question and the elastomer, while facilitating the dispersion of this filler within the elastomeric matrix. Such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom;

T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

The coupling agents usable in the composition according to the present invention are polysulphurised alkoxysilanes, which are referred to as "symmetrical" or "asymmetrical" depending on their specific structure, such as described for example in patents U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the more recent patents U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085, EP-A-1 043 357 which describe such known compounds in detail.

Particularly suitable for implementing the invention, without the definition below being limitative, are symmetrical polysulphurised alkoxysilanes which satisfy the following general formula (I):

Z-A-S$_n$-A-Z, in which:     (I)

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

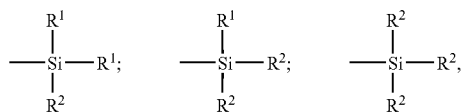

in which:

the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl).

the radicals $R^2$, which may or may not be substituted, and may be identical or different, represent a $C_1$-$C_{18}$ alkoxyl group or a $C_5$-$C_{18}$ cycloalkoxyl group (preferably $C_1$-$C_8$ alkoxyl groups or $C_5$-$C_8$ cycloalkoxyl groups, more preferably $C_1$-$C_4$ alkoxyl groups, in particular methoxyl and/or ethoxyl).

In the case of a mixture of polysulphurised alkoxysilanes in accordance with Formula (I) above, in particular conventional, commercially available, mixtures, it will be understood that the average value of the "n"s is a fractional number, preferably between 2 and 5.

As polysulphurised alkoxysilanes, mention will be made more particularly of the polysulphides (in particular disulphides, trisulphides or tetrasulphides) of bis-(($C_1$-$C_4$)alkoxyl-($C_1$-$C_4$)alkyl-silyl($C_1$-$C_4$)alkyl), such as for example the polysulphides of bis(3-trimethoxysilylpropyl) or of bis(3-triethoxysilylpropyl). Of these compounds, in particular bis (3-triethoxysilylpropyl)tetrasulphide, abbreviated TESPT, of the formula [($C_2H_5O$)$_3$Si($CH_2$)$_3$S$_2$]$_2$, or bis(triethoxysilylpropyl) disulphide, abbreviated TESPD, of the formula [($C_2H_5O$)$_3$Si($CH_2$)$_3$S]$_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4). Mention will also be made of tetrasulphurised monoalkoxysilanes, such as monoethoxydimethylsilylpropyl tetrasulphide (abbreviated to MESPT), which are the subject of international patent application PCT/EP02/03774 in the name of the applicants.

The compositions according to the invention also comprise, in addition to the diene elastomers having carboxylic acid functions along the chain and said reinforcing inorganic filler, said bonding agent, plasticisers, pigments, antioxidants, anti-ozone waxes, a cross-linking system based either on sulphur and/or on peroxide and/or on bismaleimides, cross-linking activators comprising zinc monoxide and stearic acid, extender oils, one or more agents for covering the silica, such as alkoxysilanes, polyols or amines.

In particular, these compositions may be such that the diene elastomer having carboxylic acid functions is extended using a paraffinic, aromatic or naphthenic oil, with a quantity of extender oil of between 0 and 50 phr.

Another subject of the invention is also a tread for a tire, which is such that it comprises a cross-linkable or cross-linked rubber composition such as that mentioned above, or alternatively which is such that it is formed of this composition.

Owing to the reduced hysteresis which characterizes a rubber composition according to the invention in the cross-linked state, it will be noted that a tire, the tread of which comprises said composition, has an advantageously reduced rolling resistance.

A tire according to the invention comprises this tread.

The aforementioned characteriztics of the present invention, as well as others, will be better understood on reading the following description of several examples of embodiment of the invention, which are given by way of illustration and not of limitation The following experimental techniques were in particular used for characterizing the polymers obtained.

a) The SEC technique (size exclusion chromatography) was used to determine the distributions of molecular weights relative to samples of these polymers. Starting from standard products whose characteristics are described in Example 1 of European Patent Specification EP-A-692 493, this technique made it possible to evaluate, for a sample, a number-average molecular weight which has a relative value, unlike the one determined by osmometry, and also a weight-average molecular weight (Mw). The polydispersity index (Ip=Mw/Mn) of this sample was deduced therefrom. According to this technique, the macromolecules are separated physically according to their respective sizes when swollen, in columns filled with a porous stationary phase. Before implementing this separation, the sample of polymer is solubilised at a concentration of about 1 g/l in tetrahydrofuran.

A chromatograph sold under the name "WATERS" and under the model "150C" is used for the aforementioned separation. The elution solvent is tetrahydrofuran, the flow rate is 1 ml/min, the temperature of the system is 35° C. and the duration of analysis is 30 min. A set of two "WATERS" columns is used, the type being "STYRAGEL HT6E". The injected volume of the solution of polymer sample is 100 μl. The detector is a "WATERS" differential refractometer, the model number of which is "R401". Software for processing the chromatographic data is also used, the trade name of which is "WATERS MILLENNIUM".

b) With the aim of calculating the amount of COOH functions (in meq/kg of polymer) and the number of corresponding functional units per chain of polymer, an assay method using the $^1$H NMR technique was used, after esterification with an excess of diazomethane, which reagent is known to react with COOH functions.

More precisely, this method consists of obtaining, using diazomethane, methyl ester functions from the COOH functions which have been fixed to the elastomer, in order to provide access indirectly and quantitatively to the amounts of COOH functions by $^1$H NMR.

(i) First, the diazomethane is prepared as follows:

It is obtained by action of alcoholic potassium hydroxide solution on N-methyl-N-nitrosoparatoluenesulphonamide, in the presence of diethyl ether at the temperature of melting ice. Then the ether phase containing the reagent is recovered by simple distillation.

The esterification reaction is then carried out in the following manner.

(ii) A sample of the elastomer which has been washed and dried in specific manner is solubilised in toluene, so as to be able to characterize it by analysis.

(iii) This specific preparation consists of treating the elastomer by three successive dissolution operations in toluene, respectively followed by coagulation operations in a mixture formed of acetone and water which is acidified to pH=2 with hydrochloric acid, in order to eliminate any traces of acidic compounds (stopper, antioxidant, catalytic residues, by-products such as isovaleric acid, in particular). Then the elastomer thus treated is dried in an oven at 50° C., in a vacuum and under a nitrogen atmosphere.

(iv) Then the ethereal solution containing the diazomethane is added thereto, such that there is an excess of reagent relative to the COOH functions. The polymer thus treated is subsequently coagulated in methanol, then redissolved twice in toluene and methanol to coagulate it. The polymer is then dried in a desiccator at ambient temperature and under a high vacuum by means of a vane pump.

(v) $^1$H NMR analysis is then performed in the following manner.

A sample of the polymer esterified in this way is solubilised in carbon disulphide. The $^1$H NMR signal is analysed using a spectrometer marketed under the name BRUKER AC200. The characteristic signal of the three methyl protons of $COOCH_3$ provides quantitative access to the initial amount of COOH functions in the functional polymer.

In the following examples, the properties of the compositions were evaluated as follows:

Mooney viscosity: ML(1+4) at 100° C. measured in accordance with Standard ASTM D 1646 of 1999.

Moduli of elongation ME100 (at 100%) measured in accordance with Standard ASTM D 412.

Scott break index: breaking stress (BS in MPa) and elongation at break (EB in %) measured at 23° C. in accordance with Standard ASTM D 412 of 1998.

Shore A hardness: measured in accordance with Standard ASTM D 2240 of 1997.

Hysteresis losses (HL): measured in % by rebound at 60° C. at the sixth impact, in accordance with the equation: HL (%)=100×($W_0$-$W_1$)/$W_1$, with $W_0$: energy supplied and $W_1$: energy restored.

Dynamic shear properties: measured in accordance with Standard ASTM D 2231-71, reapproved in 1977 (measurement as a function of the deformation carried out at 10 Hz with a peak-to-peak deformation of 0.15% to 50%). The hysteresis is expressed by the measurement of tan δ max. at 23° C. in accordance with Standard ASTM D2231-71.

I/Synthesis of a "Control" SBR A Prepared in Emulsion:
1) Synthesis of Latex:

3712 g of deionised, degassed water is introduced into a 10-liter reactor at 25° C. with mechanical stirring and inert atmosphere. Then an aqueous solution of 600 ml in which 56.4 g of "SDS" (sodium dodecylsulphate) has been dissolved is introduced. Then a solution of 100 ml stirene in which 3.6 ml of n-dodecylmercaptan has been dissolved is introduced. Then 792 ml of stirene is introduced, then the mixture is cooled to 12° C. Then 1504 ml of butadiene is injected, then immediately after, the initiation redox catalyst (8.385 g of sodium pyrophosphate decahydrate and 5.226 g iron sulphate heptahydrate made to react beforehand in 200 ml of water at 60° C. for 45 minutes). Finally, the radical generator is injected (3.925 g 80%-strength paramenthane hydroxide, dissolved in 100 ml of stirene). The temperature is stabilised at 5° C., and the reaction is stopped at 60% conversion by injecting 6.8 g of hydroquinone dissolved in 200 ml of water. The latex is recovered, then treated by adding 1% by weight relative to the elastomer of an antioxidant mixture named "AO2246/S13" (80%/20%).

2) Treatment of the Latex:

360 g of the latex synthesised above is taken, and subjected to vigorous mechanical stirring. 46 ml of a 200 g/l solution of sodium chloride and 810 ml of toluene is added. When the mixture is homogeneous, four successive washing operations are carried out (1 l of water per 1 l of swollen latex, and 5 ml of 35%-strength aqueous HCl per liter of water/swollen latex mixture).

Finally, the swollen latex is subjected to stripping in acidified medium, and the SBR is recovered. It is re-dissolved, and it is then extended with 38 phr of aromatic oil. This SBR is subjected to stripping once again, and there is obtained an SBR extended with oil of a Mooney viscosity ML(1+4)=53, of Tg=−33° C., of Mn=113,000 g/mol, of index Ip=4.47, of content of gel<0.3%, of content of stirene equal to 39.9%, of content of 1,2 units equal to 14.2% and of content of trans-1,4 units equal to 75%.

II/Synthesis of an SBR B Prepared in Emulsion Comprising Ester Units (tert-butyl methacrylate) Along the Chain Starting from the SBR A:

The preceding operating method is adopted, incorporating 13 ml of freshly distilled tert. butyl methacrylate at the end of the introduction of the butadiene.

An elastomer extended with 37.5 phr of aromatic oil is obtained which comprises 37 meq/kg of tert. butyl methacrylate functions, of a Mooney viscosity ML(1+4)=53.2, of a Tg=−31° C., of Mn=102,000 g/mol, of index Ip=4.57, of content of gel<0.3%, of content of stirene equal to 40%, of content of 1,2 units equal to 14.2% and of content of trans-1,4 units equal to 74.4%.

III/Obtaining an SBR C According to the Invention Comprising COOH Functions Along the Chain by Hydrolysis of the tert. butyl methacrylate Functions of the SBR B:

In order to produce acid functions, the procedure is as follows, starting from the non-extended SBR B of the preceding synthesis:

50 g of the SBR B containing 25 meq/kg of the ester functions mentioned above is redissolved in 600 ml of toluene. 9 ml of p-toluenesulphonic acid at 2.5 mol/l in THF (tetrahydrofuran) is added, and the mixture is left to react for 8 h with stirring at 80° C. At the end of the reaction, 37.5 phr of aromatic oil is added, it is reacidified by adding 2 ml of 37%-strength aqueous HCl, then stripping in acidic medium is effected (pH=1.5).

An elastomer with 37 meq/kg of COOH functions, of a viscosity ML(1+4)=65, of a Tg=−31° C., of Mn=124,000 g/mol, of index Ip=4.37, of content of gel<0.3%, of content of stirene equal to 39.8%, of content of 1,2 units equal to 14% and of content of trans-1,4 units equal to 74% is recovered.

IV/Rubber Compositions Respectively Based on SBR A, SBR B and SBR C:

Three compositions A, B and C of "passenger-car" tire-tread type were prepared, each comprising silica as reinforcing filler. These compositions are respectively based on the aforementioned elastomers SBR A, SBR B and SBR C which have been extended with aromatic oil.

The formulation of each of these compositions is as follows (expressed in phr: parts by weight per hundred parts of elastomer):

| | |
|---|---|
| Extended elastomer = | 137.5 |
| Silica (1) = | 80 |
| Bonding agent (2) = | 6.4 |
| ZnO = | 2.5 |
| Stearic acid = | 2 |
| Antioxidant (3) = | 1.9 |
| Ozone wax "C32ST" = | 1.5 |
| Sulphur = | 1.1 |
| Sulphenamide (4) = | 2 |
| Diphenylguanidine = | 1.5 |

Where:
(1)=Silica "Zeosil 1165" sold by Rhodia
(2)=bonding agent "Si69" sold by Degussa
(3)=N-(1,3-dimethylbutyl)-N'-phenyl-p-phenylenediamine
(4)=N-cyclohexyl-2-benzothiazylsulphenamide.

Each of the compositions A, B and C is produced, in a first phase of thermomechanical working, by two steps separated by a cooling phase, then, in a second, finishing, phase, by mechanical working.

There are introduced in succession into a laboratory internal mixer of the "Banbury" type, the capacity of which is 400 cm³, which is 70% filled and the initial temperature of which is approximately 90° C., the elastomer, two-thirds of the reinforcing filler, the coupling agent, the diphenylguanidine and the stearic acid, then, approximately one minute later, the rest of the reinforcing filler, the aromatic oil and the antiozone wax "C32ST".

The first thermomechanical working step is performed for 5 minutes, until a maximum dropping temperature of about 160° C. is achieved. The elastomeric block is then recovered and cooled.

Then a second step of thermomechanical working is performed in the same mixer for 4 minutes, with addition of the antioxidant, until a maximum dropping temperature of about 160° C. is achieved.

The aforementioned first phase of thermomechanical working is thus effected, it being specified that the average speed of the blades of this first phase is 85 rpm.

The mixture thus obtained is recovered, is cooled and then, in an external mixer (homo-finisher), the sulphur and sulphenamide are added at 30° C., by mixing everything for 3 to 4 minutes (mechanical working).

The compositions thus obtained are then calendered, either in the form of sheets (of a thickness of 2 to 3 mm) or of fine films of rubber in order to measure their physical or mechanical properties, or in the form of profiled elements which can be used directly, after cutting out and/or assembly to the dimensions desired, for example as semi-finished products for tires, in particular for treads.

The cross-linking is carried out at 150° C. for 40 min.

It will be noted that all the zinc monoxide (ZnO) is introduced at 120° C. in the first step of thermomechanical working, in order to obtain the cross-linkable compositions B and C. The results are set forth in the table below.

TABLE

| | COMPOSITION | | |
|---|---|---|---|
| | A | B | C |
| Elastomer | SBR A | SBR B | SBR C |
| ML(1 + 4) at 100° C. (rubber) | 53 | 53 | 65 |
| Properties in the non-vulcanised state | | | |
| ML(1 + 4) at 100° C. ("Mooney mixture") | 84 | 80 | 90 |
| Properties in the vulcanised state | | | |
| Shore A | 66.4 | 66.9 | 63.7 |
| ME10 (MPa) | 5.94 | 6.36 | 4.82 |
| ME100 (MPa) | 1.68 | 1.67 | 1.83 |
| ME300 (MPa) | 2.02 | 1.98 | 2.59 |
| ME300/ME100 | 1.20 | 1.18 | 1.42 |
| Scott break index at 23° C. | | | |
| BS (MPa) | 26.3 | 26.3 | 28.3 |
| EB (%) | 610 | 610 | 580 |
| Losses 60° C. | 30.9 | 32.2 | 29.1 |
| Dynamic properties as a function of deformation | | | |
| $\Delta G^*23°$ C. (MPa) | 4.29 | 4.96 | 1.31 |
| $\tan(\delta)_{max}$ 23° C. | 0.364 | 0.380 | 0.242 |

As far as the properties in the cross-linked state are concerned, it will be noted, on one hand, that the ratio ME300/ME100 of composition C based on SBR C having COOH functions along the chain is greater than that of compositions A and B respectively based on the non-functional SBR A and the SBR having ester functions along the chain, and, on the other hand, that the hysteresis properties at low and high deformations ($\tan(\delta)_{max}$ at 23° C. and losses at 60° C., respectively) of said composition C are greatly improved compared with those of said compositions A and B.

It will also be noted that composition C according to the invention has a value of Mooney "mix" which is close to that of said compositions A and B.

In other words, composition C, based on SBR C, silica and characterized by the introduction of all the ZnO at 120° C. during the first stage of mixing of the first phase of thermomechanical working, has rubber properties in the cross-linked state (in particular hysteresis properties at low deformations) which are distinctly improved compared with those of compositions A and B, and a processing ability equivalent to that of composition A based on silica and the non-functional SBR A.

What is claimed is:

1. A cross-linkable or cross-linked rubber composition which is usable for constituting a tire tread, said composition being cross-linkable or cross-linked in the presence of a cross-linking system based on at least one compound chosen from sulphur, peroxide and bismaleimide, and being based on at least:
  a reinforcing inorganic filler consisting of silica, aluminum hydroxides or aluminas,
  a diene elastomer having a molar ratio of units originating from conjugated dienes which is greater than 30%, which is prepared in emulsion and comprises carboxylic acid functions along its chain, wherein the diene elastomer is not a nitrile rubber,
  a bonding agent between said reinforcing inorganic filler and said elastomer which comprises a polysulphurised alkoxysilane, and
  a crosslinking compound chosen from sulphur, peroxide and bismaleimide, wherein said elastomer is obtained by effecting:
  in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain.

2. A rubber composition according to claim 1, wherein said precursor comonomer is an unsaturated carboxylic acid derivative which is hydrolysable to form said acid.

3. A rubber composition according to claim 2, wherein said precursor comonomer is an unsaturated ester of the formula $R_1$—C(O)O—$R_2$, where $R_1$ is an aliphatic or alicyclic hydrocarbon group which comprises at least one double bond or alternatively an aromatic hydrocarbon group to which is linked a substituent comprising at least one double bond, and where $R_2$ is an alkyl group.

4. A rubber composition according to claim 3, wherein said precursor comonomer is selected from the group consisting of alkyl acrylates, alkyl methacrylates and alkyl trans-3-phenyl propenoates.

5. A rubber composition according to claim 4, wherein said precursor comonomer is a tert. butyl acrylate or methacrylate.

6. A rubber composition according to claim 2, wherein said precursor comonomer is an unsaturated amide of the formula $R_3$—C(O)N—$R_4R_5$, where $R_3$ is an aliphatic or alicyclic hydrocarbon group which comprises at least one double bond or alternatively an aromatic hydrocarbon group to which is linked a substituent comprising at least one double bond, and where $R_4$ and $R_5$ are alkyl groups which are each linked to the nitrogen atom.

7. A rubber composition according to claim 6, wherein said precursor comonomer is selected from the group consisting of acrylamide, methacrylamide, N,N-dimethylacrylamide, N,N-dimethylmethacrylamide, N-methylcinnamide, N-tert. butylcinnamide and N,N-dimethylcinnamide.

8. A rubber composition according to claim 2, wherein said precursor comonomer is an unsaturated nitrile of the formula $R_6$—CN, where $R_6$ is an aliphatic or alicyclic hydrocarbon group which comprises at least one double bond, or alternatively an aromatic hydrocarbon group to which is linked a substituent comprising at least one double bond.

9. A rubber composition according to claim 8, wherein said precursor comonomer is selected from the group consisting of acrylonitrile, methacrylonitrile, vinylacetonitrile and 3-phenyl propenitrile.

10. A rubber composition according to claim 2, wherein said precursor comonomer is an unsaturated dicarboxylic acid anhydride which comprises at least one double bond.

11. A rubber composition according to claim 10, wherein said precursor comonomer is selected from the group consisting of maleic anhydride and citraconic anhydride.

12. A rubber composition according to claim 1, wherein said precursor comonomer is oxidisable to carboxylic acid and is selected from the group consisting of:

unsaturated alcohols of the formula $R_7$—OH, where $R_7$ is an aliphatic or alicyclic hydrocarbon group which comprises at least one double bond, or alternatively an aromatic hydrocarbon group to which is linked a substituent comprising at least one double bond, and unsaturated aldehydes of the formula $R_8$—CHO, where $R_8$ is an aliphatic or alicyclic hydrocarbon group which comprises at least one double bond, or alternatively an aromatic hydrocarbon group to which is linked a substituent comprising at least one double bond.

13. A rubber composition according to claim 12, wherein said precursor comonomer is an unsaturated alcohol selected from the group consisting of allyl alcohol, crotyl alcohol, methallyl alcohol and cinnamyl alcohol.

14. A rubber composition according to claim 12, wherein said precursor comonomer is an unsaturated aldehyde selected from the group consisting of crotonaldehyde and cinnamaldehyde.

15. A rubber composition according to claim 12, wherein said diene elastomer comprises a molar ratio of units originating from conjugated dienes which is greater than 50%.

16. A rubber composition according to claim 15, wherein said diene elastomer is selected from the group consisting of polybutadienes, butadiene/styrene copolymers and butadiene/styrene/isoprene copolymers.

17. A rubber composition according to claim 1, wherein said diene elastomer having carboxylic acid functions along the chain comprises a total quantity of emulsifying agent which is less than 3.5 phr.

18. A rubber composition according to claim 1, wherein said diene elastomer having carboxylic acid functions along the chain is extended using a paraffinic, aromatic or naphthenic oil, with a quantity of extender oil of between 0 and 50 phr.

19. A rubber composition according to claim 1, wherein said diene elastomer having carboxylic acid functions along the chain has a molecular weight greater than 100,000 g/mol.

20. A rubber composition according to claim 1, wherein the elastomeric matrix of said composition comprises in a majority proportion or exclusively said diene elastomer comprising carboxylic acid functions along the chain.

21. A rubber composition according to claim 1, wherein said reinforcing inorganic filler is present in said rubber composition in a quantity equal to or greater than 40 phr.

22. A rubber composition according to claim 1, wherein it comprises a reinforcing filler comprising in a majority proportion or exclusively said reinforcing inorganic filler, such that the mass fraction of said reinforcing inorganic filler in said reinforcing filler is greater than 50% and less than or equal to 100%.

23. A rubber composition according to claim 22, wherein said reinforcing inorganic filler comprises in part or in its entirety silica.

24. A rubber composition according to claim 22, wherein said reinforcing inorganic filler comprises in part or in its entirety alumina.

25. A process for the preparation of a cross-linkable or cross-linked rubber composition which is usable for constituting a tire tread, said composition being based on at least:

a reinforcing inorganic filler consisting of silica, aluminum hydroxides or aluminas, a diene elastomer having a molar ratio of units originating from conjugated dienes which is greater than 30%, which is prepared in emulsion and comprises carboxylic acid functions along its chain, wherein the diene elastomer is not a nitrile rubber, and a bonding agent between said reinforcing inorganic filler and said elastomer which comprises a polysulphurised alkoxysilane, wherein the rubber composition comprises a reinforcing filler comprising in a majority proportion or exclusively said reinforcing inorganic filler, such that the mass fraction of said reinforcing inorganic filler in said reinforcing filler is greater than 50% and less than or equal to 100%, and wherein said elastomer is obtained by effecting:

in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain, the process comprising the following steps:

(i) at least one diene elastomer comprising carboxylic acid functions along the chain and having a molar ratio of units originating from conjugated dienes which is greater than 30% is prepared in emulsion, using:

in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain; and (ii) there is then effected:

at a maximum temperature of between 130 and 200° C., a first phase of thermomechanical working of the constituents of said composition comprising the elastomer obtained in step (i), a reinforcing inorganic filler and a reinforcing inorganic filler/diene elastomer bonding agent comprising a polysulphurised alkoxysilane, with the exception of the cross-linking system, then a second phase of mechanical working at a temperature less than 120° C., during which said cross-linking system is incorporated.

26. A process for the preparation of a cross-linkable or cross-linked rubber composition which is usable for constituting a tire tread, said composition being based on at least:

a reinforcing inorganic filler, a diene elastomer having a molar ratio of units originating from conjugated dienes which is greater than 30%, which is prepared in emulsion and comprises carboxylic acid functions along its chain, wherein the diene elastomer is not a nitrile rubber, and a bonding agent between said reinforcing inorganic filler and said elastomer which comprises a polysulphurised alkoxysilane, wherein said elastomer is obtained by effecting:

in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain, the process comprising:

(i) at least one diene elastomer comprising carboxylic acid functions along the chain and having a molar ratio of units originating from conjugated dienes which is greater than 30% is prepared in emulsion, using:

in an emulsifying solution, radical copolymerization of at least one conjugated diene monomer with a precursor comonomer which is hydrolysable or oxidizable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain; and (ii) there is then effected:

at a maximum temperature of between 130 and 200° C., a first phase of thermomechanical working of the constituents of said composition comprising the elastomer obtained in step (i), an antioxidant, a reinforcing inorganic filler and a reinforcing inorganic filler/diene elastomer bonding agent comprising a polysulphurised alkoxysilane, with the exception of the cross-linking system, comprising:

a first step in which said constituents used in said first phase, with the exception of the antioxidant, are mixed together, and a second step in which the antioxidant is incorporated and mixed with the constituents of said first step, zinc monoxide being added during said first phase to activate the later cross-linking, then a second phase of mechanical working at a temperature less than 120° C., during which said cross-linking system is incorporated, wherein all said zinc monoxide is incorporated during said first step of said first phase of thermomechanical working.

27. A process for the preparation of a cross-linkable or cross-linked rubber composition which is usable for constituting a tire tread, said composition being based on at least:

a reinforcing inorganic filler, a diene elastomer having a molar ratio of units originating from conjugated dienes which is greater than 30%, which is prepared in emulsion and comprises carboxylic acid functions along its chain, wherein the diene elastomer is not a nitrile rubber, and a bonding agent between said reinforcing inorganic filler and said elastomer which comprises a polysulphurised alkoxysilane, wherein said elastomer is obtained by effecting:

in an emulsifying solution, radical copolymerisation of at least one conjugated diene monomer with a precursor comonomer which is hydrolysable or oxidisable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain, the process comprising:

(i) at least one diene elastomer comprising carboxylic acid functions along the chain and having a molar ratio of units originating from conjugated dienes which is greater than 30% is prepared in emulsion, using:

in an emulsifying solution, radical copolymerization of at least one conjugated diene monomer with a precursor comonomer which is hydrolysable or oxidizable to carboxylic acid, in order to obtain an intermediate diene elastomer comprising precursor functions of said acid along its chain, then hydrolysis or oxidation of said precursor functions in order to obtain said elastomer comprising carboxylic acid functions along the chain; and (ii) there is then effected:

at a maximum temperature of between 130 and 200° C., a first phase of thermomechanical working of the constituents of said composition comprising the elastomer obtained in step (i), an antioxidant, a reinforcing inorganic filler and a reinforcing inorganic filler/diene elastomer bonding agent comprising a polysulphurised alkoxysilane, with the exception of the cross-linking system, comprising:

a first step in which said constituents used in said first phase, with the exception of the antioxidant, are mixed together, and a second step in which the antioxidant is incorporated and mixed with the constituents of said first step, zinc monoxide being added during said first phase to activate the later cross-linking, then a second phase of mechanical working at a temperature less than 120° C., during which said cross-linking system is incorporated, wherein magnesium monoxide is incorporated during said first step of said first phase of thermomechanical working.

28. A tread for a tire, comprising a cross-likable or cross-liked rubber composition in accordance with claim 1.

29. A tire tread according to claim 28, wherein it is formed of said cross-linkable or cross-linked rubber composition.

30. A tire having reduced rolling resistance, comprising a tread according to claim 29.

31. A rubber composition, comprising:

an inorganic filler consisting of silica, aluminum hydroxides or aluminas, a diene elastomer having a molar ratio of units originating from conjugated dienes which is greater than 30%, and comprising carboxylic acid functions along its chain, wherein the diene elastomer is not a nitrile rubber, a bonding agent which comprises a polysulphurised alkoxysilane, and a crosslinking compound chosen from sulphur, peroxide and bismaleimide.

* * * * *